UNITED STATES PATENT OFFICE 2,414,398

HALOGENATED PHENACYLPYRIDINES AND PROCESS OF PREPARING THE SAME

James M. Smith, Jr., North Plainfield, N. J., assignor to American Cyanamid Company, New York, N. Y., a corporation of Maine No Drawing. Application June 9, 1945,
Serial No. 598,626

11 Claims. (Cl. 260—295)

This invention relates to new organic compounds and to methods of preparing the same.

The new compounds of the present invention may be illustrated by the following general formula:

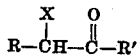

in which X is a halogen, R is a member of the group consisting of pyridine, benzopyridine and alkyl pyridine radicals, and R' is an aryl radical. The compounds are characterized as being crystalline solids, substantially insoluble in water and difficultly soluble in inert organic solvents. These new compounds are useful as intermediates in the preparation of analgesics and other useful organic compounds, some having therapeutic properties.

Compounds having the above formula may be prepared by treating a phenacylpyridine with a halogen, such as bromine or chlorine, while suspended or dissolved in a suitable organic liquid at temperatures of from about 10° C. to 100° C., preferably between 20° and 50° C. The resulting ω-halophenacylpyridine may be used directly or it may be isolated by precipitation upon dilution of the solvent with water or by evaporation of the solvent, as illustrated in the specific examples.

Among the phenacylpyridines which may be halogenated in accordance with the process of the present invention are such phenacylpyridines as 2-phenacylpyridine, 4-phenacylpyridine, 2-phenacyl-5,6-benzopyridine, 4-phenacyl-5,6-benzopyridine, 2-methyl-6-phenacylpyridine, 4-methyl-2-phenacylpyridine, 4,6-dimethyl-2-phenacylpyridine, 2-methyl-5-ethyl-6-phenacylpyridine, and other phenacylpyridines having alkyl and alkylene substituents on the pyridine ring. The aryl radical, R', may have one or more substituent radicals, such as chlorine, bromine, methyl, methoxy, nitro carbethoxy, and the like.

To properly halogenate the phenacylpyridine I use a substantially equimolar proportion of the halogen; that is, about two equivalents of halogen for each mole of the phenacylpyridine. If a large excess of halogenating agent is used, for example, more than 10% of the theoretical requirements, the yield of pure product is greatly reduced.

As solvents for the reaction there may be used glacial acetic acid, trichlorethylene, ethylene dichloride, diethyl ether, dibutyl ether, chloroform, carbon disulfide, and other organic liquids which are substantially inert to bromine under conditions of the reaction. In general, the presence of water is to be avoided as it tends to cause hydrolysis with resulting splitting of the phenacylpyridine. Of the various solvents, I greatly prefer to use glacial acetic acid although ether is preferred when halogenating 2-phenacylbenzopyridine.

Although the reaction proceeds rapidly and reaches a substantial degree of completion within a few minutes, particularly when using chlorine at room temperature, it may be advisable, and will do no harm, to allow the reactants to remain in contact for several hours.

The invention will be illustrated in greater detail by means of the following specific examples in which representative phenacylpyridines are halogenated under different conditions to produce the new compounds of the present invention. It is to be understood that these examples are intended to illustrate the invention and are not in limitation thereof since, obviously, certain changes may be made therein by those skilled in the art.

*Example 1*

A solution of 22.4 g. 2-phenacylpyridine (Scheuing and Winterhalder to Boehringer and Sohn, D. R. P. 594,849, 3/22/34; Friedl. 19, 1147) in 200 cc. glacial acetic acid at 90° C. is treated with a slight excess of the theoretical two equivalents of bromine dissolved in 200 cc. glacial acetic acid, added over a period of about one hour. The temperature is maintained at 90–100° C. for about one hour longer, then the solution is cooled to room temperature and allowed to stand overnight. The next day 150 cc. of solvent is distilled off. On dilution of the residual solution with ice and water, the 2-(ω-bromophenacyl)pyridine precipitates and is isolated by filtration. The new compound may be purified by dissolving in acetic acid, treating with activated charcoal, filtering, and diluting the filtrate with ice. It melts at 93–94° C.

*Example 2*

A solution of 54.4 g. bromine in 500 cc. glacial acetic acid is added during about two hours to a solution of 67.2 g. 2-phenacylpyridine in 600 cc. glacial acetic acid at room temperature, and the resulting solution is allowed to stand overnight at room temperature. It is then diluted to 8 liters with ice and water, and after standing for about one hour at 10–20° C. the crystalline precipitate is filtered and washed with water to remove acetic acid. The 2-(ω-bromophenacyl)pyridine may be dried as is; or preferably the cake is wetted with a volatile solvent such as hexane or isopropyl ether, sucked as dry as possible on the filter, and then dried at about 50° C. to constant weight. The yield of 2-(ω-bromophenacyl)- pyridine is 72 g. melting at 94° C. From the dilute acetic acid filtrate there is obtained by buffering with about 100 g. sodium acetate (hydrated), 12.5 g. more 2-(ω-bromophenacyl)pyridine, melting point 91–93° C.

Example 3

To a solution of 98.6 g. of 4-phenacylpyridine (A. E. Tchitchibabin, Rec. Trav. Chim. 57, 582–5 (1938)) in 375 cc. of glacial acetic acid at room temperature there is added rapidly with vigorous stirring a solution of 79.9 g. of bromine in 125 cc. of glacial acetic acid. The temperature rises to 55° C. and crystals begin to form almost immediately. After standing for 45 minutes the light grey crystals of 4-(ω-bromophenacyl)pyridine hydrobromide are isolated by filtration, glacial acetic acid is removed by washing with mixed hexanes and the product is dried at 50° C. The yield of 4-(ω-bromophenacyl)pyridine hydrobromide is 178.5 g. representing 100% of the theory; the melting point is about 221° C. (decomp.). It may be crystallized from glacial acetic acid. It is stable if kept in a tightly stoppered bottle but decomposes rapidly on exposure to moisture.

Example 4

A solution of 45 g. 4-styrylquinoline hydrochloride in 350 cc. boiling chloroform is treated with 25 g. bromine in 50 cc. chloroform. After about 30 minutes' boiling, precipitation begins; gentle refluxing on the warm water bath is continued for one hour. The charge is cooled and the product is collected on the filter. It is dried at about 50° C. The yield of dibromo-4-styrylquinoline hydrochloride is 63 g. It melts with decomposition at about 190° C.

Treatment of 44.4 g. of dibromo-4-styrylquinoline hydrochloride with 88 g. potassium hydroxide in 800 cc. hot alcohol gives 22 g. phenyl-4-quinolylacetylene; boiling point 205–210° C. at 3 mm.

A solution of 15 g. phenyl-4-quinolylacetylene in 1000 cc. 65% sulfuric acid is boiled five minutes. On cooling, dilution, and neutralization with ammonia there is obtained 16 g. 4-phenacylquinoline; melting point about 114° C.

A solution of 10 g. 4-phenacylquinoline in 100 cc. glacial acetic acid is treated with a slight excess of the theoretical amount of bromine in 25 cc. glacial acetic acid, which is added at 20–25° C. in about fifteen minutes. After standing at room temperature for several hours, the solution is treated with a little activated charcoal and filtered. The filtrate is diluted with water to about 1 liter of solution, and the precipitate is collected on the filter. It is then washed with water, wet with a volatile solvent such as mixed hexanes, or isopropylacetate, and dried at about 50° C. The yield of 4-(ω-bromophenacyl)-5,6-benzopyridine is 10 g.; melting point about 115–120° C.

Example 5

50 g. of 2-phenacylquinoline (Scheuing and Winterhalder to Boehringer and Sohn, D. R. P. 594,849, 3/22/34; Friedl. 19, 1147) in 1500 cc. anhydrous ether with 20 g. powdered calcium carbonate is treated with 32 g. bromine in 500 cc. absolute ether, added in about fifteen minutes. After stirring for three hours at room temperature, the thin slurry contains 2-(ω-bromophenacyl)quinoline. This slurry is used without isolation of the product in the production of analgesics by simply adding the necessary intermediates thereto.

Example 6

100 parts by weight of 4-pyrophthalone (see Ber. 38, 161 (1905)) is added to 1225 parts of water and the slurry dissolved by the addition of one equivalent weight of 5 N sodium hydroxide. The red solution is heated to 85–90° C. and 79 parts by weight of diethyl sulfate is gradually added. A yellow precipitate rapidly appears. The mixture is heated after the addition of the ethylating agent for a time sufficient to complete the reaction. The reaction mixture is cooled, and the product removed by filtration. The light yellow crystals are washed thoroughly with water and dried. The yield of 4-(o-carbethoxyphenacyl)pyridine is about 100 parts by weight. The melting point is 253.7 to 256.7° C.

To 150 parts by weight of glacial acetic acid is added 100 parts by weight of 4-(o-carbethoxyphenacyl)pyridine. To the solution at approximately room temperature is added 63 parts by weight of bromine. A yellow precipitate rapidly appears. This is the hydrobromide of the product, 4-(ω-bromo-o-carbethoxyphenacyl)pyridine. After the addition is complete, the slurry is stirred for a short time and then the solid removed by filtration. The solid is washed thoroughly with an organic solvent to remove the acetic acid. It is then dried. The yield is about 50 parts by weight but more material may be obtained in the mother liquor. The melting point, with decomposition, is 225.5° C.

Example 7

Chlorine is bubbled through a solution of 19.7 g. 2-phenacylpyridine in 100 cc. glacial acetic acid at 15–20° C. until 7.1 g. chlorine is absorbed. After standing about one hour at room temperature, the solution is diluted with ice and water. The product is collected on the filter, washed with water and with hexane, and dried rapidly at 45° C. in 15–45 minutes.

I claim:
1. Compounds having the general formula

in which X is a halogen, R is a member of the group consisting of pyridine, benzopyridine and alkylpyridine radicals, and R' is an aryl radical.

2. Compounds having the general formula

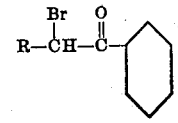

in which R is a pyridine radical.

3. 2-(ω-bromophenacyl)pyridine.
4. 4-(ω-bromophenacyl)pyridine.
5. ω-bromo-4-phenacyl-5,6-benzopyridine.
6. A method of preparing compounds having the general formula

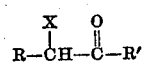

in which X is a halogen, R is a member of the group consisting of pyridine, benzopyridine and alkylpyridine radicals, and R' is an aryl radical which comprises the steps of suspending a phenacylpyridine in an inert organic liquid with a halogen at a temperature of about 10° C. to 100° C.

7. A method of preparing compounds having the general formula

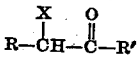

in which X is a halogen, R is a member of the group consisting of pyridine, benzopyridine and alkylpyridine radicals, and R' is an aryl radical, which comprises the steps of suspending a phenacylpyridine in glacial acetic acid with a halogen at a temperature of about 10° C. to 100° C.

8. A method of preparing compounds having the general formula

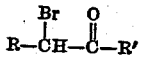

in which R is a pyridine radical and R' is an aryl radical which comprises the steps of suspending a phenacylpyridine in glacial acetic acid with bromine at a temperature within the range 10° C. to 100° C.

9. A method of preparing 2-(ω-bromophenacyl)pyridine which comprises suspending 2-phenacylpyridine in glacial acetic acid with bromine at a temperature within the range 10° C. to 100° C.

10. A method of preparing 4-(ω-bromophenacyl)pyridine which comprises suspending 4-phenacylpyridine in glacial acetic acid with bromine at a temperature within the range 10° C to 100° C.

11. A method of preparing 4-(ω-bromophenacyl)-5,6-benzopyridine which comprises suspending 4-phenacyl-5,6-benzopyridine in glacial acetic acid with bromine at a temperature within the range 10° to 100° C.

JAMES M. SMITH, Jr.